Sept. 4, 1945. F. S. KEAHEY 2,384,095
ROD COUPLING
Filed Jan. 3, 1944

INVENTOR.
FRANK S. KEAHEY
BY

Patented Sept. 4, 1945

2,384,095

UNITED STATES PATENT OFFICE 2,384,095

ROD COUPLING

Frank S. Keahey, Sturgis, Mich., assignor, by direct and mesne assignments, to Kirsch Company, Sturgis, Mich.

Application January 3, 1944, Serial No. 516,797

9 Claims. (Cl. 287—87)

The main objects of this invention are:

First, to provide a coupling which is well adapted for use in control rods or the like for airplanes and in other relations where flexible joints are desirable.

Second, to provide a ball and socket type of coupling member having coacting spherical internal and external continuous bearing surfaces which may be readily assembled.

Third, to provide a coupling having these advantages which presents a smooth exterior and, while compact, is strong and durable.

Objects pertaining to details and economies of the invention will definitely appear from the description to follow. The invention is defined in the claims.

A structure which embodies the features of the invention is clearly illustrated in the accompanying drawing, in which.

Figure 1:
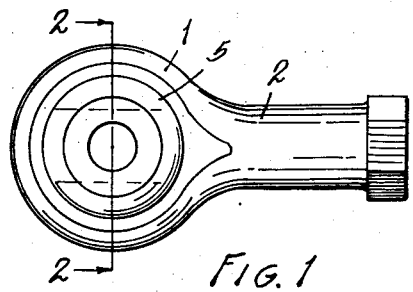
Fig. 1 is a side elevation of a coupling embodying my invention with parts in assembled bearing relation.

The embodiment of my invention illustrated in Figs. 1 to 6, inclusive, comprises a socket member 1 having a stem 2 adapted to be connected to a rod, cable or the like, the connecting means not being illustrated. The socket member has an internal annular bearing 3 of spherically curved concave section.

The ball member designated generally by the numeral 5 comprises the main ball member 6 having an axial bore 7 adapted to receive a coupling pin. The ball member 6 has opposed segmental spherically curved bearing portions 8 of convex section adapted to coact with the internal bearing 3 of the socket member. The member 6 has opposed flattened non-bearing surfaces 9 between its bearing portions 8, these flattened sides or surfaces preferably being parallel. The complementary auxiliary ball members 10 have spherically curved bearing portions 11 which are complementary to the bearing portion 8 to provide a continuous bearing surface. These members 10 are superimposed on the surfaces 9, their inner sides 12 being flat with the exception of the shallow recesses 13 which are adapted to receive solder indicated at 14. These recesses are shown of exaggerated depth as they are very shallow and only of such depth as to facilitate retaining the leaf of solder during the assembling.

Figure 2:
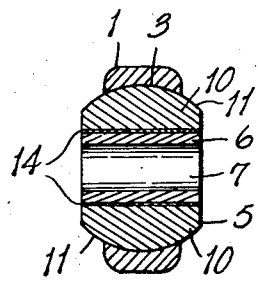
Fig. 2 is a transverse section on line 2—2 of Fig. 1.
Figure 3:
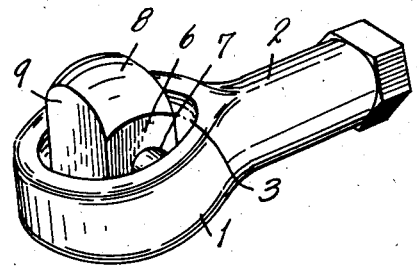
Fig. 3 is a perspective view illustrating certain structural features and steps in the manufacture of the structure.
Figure 4:
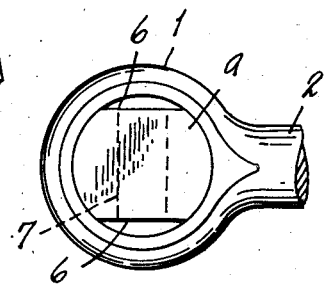
Fig. 4 is a fragmentary side elevation of the parts illustrated in Fig. 3.
Figure 5:
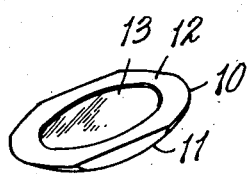
Fig. 5 is an inverted perspective view of one of the auxiliary ball members.

In assembling the main bearing element 6 is introduced into the socket member by presenting thereto as indicated in Fig. 3, and is then turned to the position shown in Fig. 4. The auxiliary bearing members are then superimposed upon the flattened sides 9 of the main bearing member as they are presented in Fig. 4 with the solder between and heat and pressure applied by means of the opposed members 15 (see Fig. 6). Some relatively low melting point solder is preferably used. The socket member is supported by the bed 16 having a recess 17 therein so that when moderate pressure and heat are applied the auxiliary ball members are fixed to the main ball member and the parts may then be swung or tilted on the axis of the ball member to bring all of the bearing surfaces into bearing relation with the socket member, as shown in Figs. 1 and 2.

Figure 6:
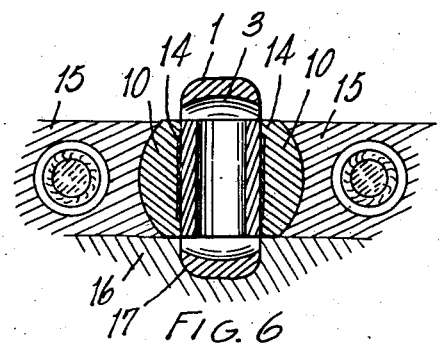
Fig. 6 is a fragmentary section illustrating one of the steps of manufacturing the embodiment of my invention shown in Figs. 1 and 2.

One of the main purposes of thus securing the auxiliary ball members 10 to the main ball member 6, as shown in Fig. 6, is not only to fixedly connect these members to each other, but is also to prevent the same when so connected from being disengaged from the socket member 1 prior to assembly with the coacting coupling element, usually in the form of a clevis with a pin arranged through the bore 7. There is no strain upon the connection for these elements when in use. I thus secure a complete annular bearing relation between the socket bearing and the ball bearing, and a relatively close fit may be had. The ball bearing elements may be formed by pressing from powdered metal which is characterized by self lubricating qualities so that additional lubrication is not usually required in use.

Figures 7, 8:
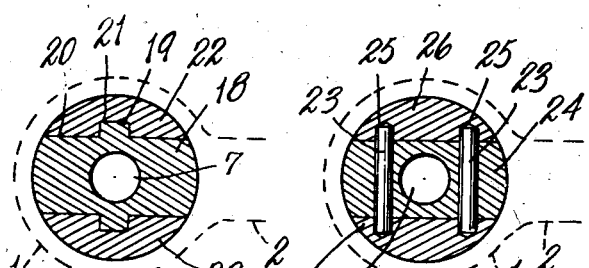
Fig. 7 is a fragmentary section, the socket member being indicated by dotted lines, of a modified form or embodiment of the invention.
Fig. 8 is a fragmentary section corresponding to Fig. 7 of a further modification or embodiment of my invention.

In the embodiment shown in Fig. 7, the main ball bearing member 18 is provided with lugs 19 on its non-bearing surface 20, these lugs engaging recesses 21 in the auxiliary bearing members 22. This provides keyed connection between the parts and the fittedly engaged parts may be such that they are effectively retained in assembled relation. The same is true of the embodiment shown in Fig. 8 in which dowel pins 23 are arranged through the main ball member 24 to engage sockets 25 provided therefor in the auxiliary members 26.

These alternate means for securing the ball members in assembled relation within the socket member are also very satisfactory. I have not attempted to illustrate or describe other embodiments or modifications of my invention as it is believed this disclosure will enable those skilled in the art to embody or adapt my invention as may be desired.

Having thus described my invention what I claim as new and desire to secure by Letters Patent is:

1. In a coupling, the combination of a socket member having an internal annular bearing of concave section, a main ball member having an axial coupling pin opening and having opposed segmental bearing portions of convex section adapted to coact with the internal bearing of said socket member, said main ball member having opposed flattened surfaces between its said segmental bearing portions, and segmental auxiliary ball members having segmental bearing portions of convex section complemental to said bearing portions of said main ball member and having flattened inner side surfaces superimposed upon the flattened surfaces of said main ball member, said flattened surfaces of said auxiliary ball members having shallow central recesses therein, and a relatively thin layer of metal disposed in each of said recesses and having an integral-like bonding union with adjoining superimposed flattened surfaces of the auxiliary and main ball members, said layer of metal having a relatively low melting temperature to facilitate melting the same in the recess to effect said bonding union with the adjoining superimposed surfaces whereby the ball members are retained in assembled relation permitting the assembled ball members to be angularly adjusted to bring their bearing portions into coacting bearing relation to said socket member.

2. In a coupling, the combination of a socket member having an internal annular bearing of concave section, a main ball member having an axial coupling pin opening and having opposed segmental bearing portions of convex section adapted to coact with the internal bearing of said socket member, said main ball member having opposed flattened surfaces between its said segmental bearing portions, and segmental auxiliary ball members having segmental bearing portions of convex section complemental to said bearing portions of said main ball member and having flattened inner side surfaces superimposed upon the flattened surfaces of said main ball member, and means extending between the superimposed flattened surfaces of the main and auxiliary ball members for securing the auxiliary ball members to the main ball member whereby the ball members are retained in assembled relation permitting the assembled ball members to be angularly adjusted to bring their bearing portions into coacting bearing relation to said socket member.

3. In a coupling, the combination of a socket member having an internal annular bearing of concave section, a main ball member having opposed segmental spherically curved bearing portions adapted to coact with the internal bearing of said socket member, said main ball member having opposed flattened surfaces between its said bearing portions, and segmental auxiliary ball members having spherically curved bearing portions complemental to the bearing portions of said main ball member and having flattened inner side surfaces superimposed on said flattened surfaces of said main ball member and relatively thin layers of metal disposed between the superimposed flattened surfaces and having an integral-like bonding union therewith, said layers of metal having a relatively low melting temperature to facilitate melting the same between said superimposed surfaces to effect the bonding union therewith whereby the ball members are retained in assembled relation permitting the assembled main and auxiliary ball members being rotated into coacting bearing relation with said socket member.

4. In a coupling, the combination of a socket member having an internal annular bearing of concave section, a main ball member having opposed segmental spherically curved bearing portions adapted to coact with the internal bearing of said socket member, said main ball member having opposed flattened surfaces between its said bearing portions, and segmental auxiliary ball members having spherically curved bearing portions complemental to the bearing portions of said main ball member and having flattened inner side surfaces superimposed on said flattened surfaces of said main ball member, and means extending between the superimposed flattened surfaces of the main and auxiliary ball members for securing the auxiliary ball members to the main ball member whereby they are retained in assembled relation permitting the assembled main and auxiliary ball members being rotated into coacting bearing relation with said socket member.

5. In a bearing, the combination of a socket member having an internal annular spherically curved bearing, a main ball member having opposed segmental spherically curved bearing portions adapted to coact with the internal bearing of said socket member, said main ball member having cut-away non-bearing portions between its said segmental bearing portions, and segmental auxiliary ball members having segmental spherically curved bearing portions complemental to the segmental bearing portions of said main ball member, said auxiliary ball members having non-bearing portions superimposed on said non-bearing portions of said main ball member, and means extending between and disposed within the superimposed non-bearing portions for securing the auxiliary ball members to the main ball member to facilitate the assembled ball members being angularly adjusted as a unit to bring their bearing surfaces into coacting bearing relation with said socket member.

6. In a bearing, the combination of a socket member having an internal annular spherically curved bearing, a main ball member having opposed segmental spherically curved bearing portions adapted to coact with the internal bearing of said socket member, said main ball member having cut away non-bearing portions between its segmental bearing portions, and segmental auxiliary ball members having segmental spherically curved bearing portions complemental to the segmental bearing portions of said main ball member, said auxiliary ball members having non-bearing portions superimposed on said non-bearing portions of said main ball member, and means extending between and disposed within the superimposed non-bearing portions for securing the auxiliary ball members to the main ball member to retain them in assembled relation when they are not in coacting bearing relation with said socket member.

7. In a bearing, the combination of a socket member having an internal annular spherically curved bearing, a main ball member having opposed spherically curved bearing portions adapted to coact with the internal bearing of said socket member, and opposed non-bearing portions between its said bearing portions, and segmental auxiliary ball members having spherically curved bearing portions complementary to the bearing portions of said main ball member, said auxiliary ball members having non-bearing portions superimposed on said non-bearing portions of said main ball member, and relatively thin layers of metal disposed between the superimposed non-bearing portions and having an integral-like bonding union therewith, said layers of metal having a relatively low melting temperature to facilitate melting the same between said superimposed portions to effect said bonding union therewith whereby the ball members are retained in assembled relation when not in bearing relation to the socket member.

8. In a bearing, the combination of a socket member having an internal annular spherically curved bearing, a main ball member having opposed spherically curved bearing portions adapted to coact with the internal bearing of said socket member, and opposed non-bearing portions between its said bearing portions, and segmental auxiliary ball members having spherically curved bearing portions complementary to the bearing portions of said main ball member, said auxiliary ball members having non-bearing portions superimposed on said non-bearing portions of said main ball member, and dowel pins extending between the superimposed non-bearing portions and disposed within the same whereby the auxiliary ball members are retained in assembled relation with the main ball member permitting the assembled ball members being adjusted as a unit to bring their bearing surfaces into coacting bearing relation with said socket member.

9. In a bearing, the combination of a socket member having an internal annular spherically curved bearing surface, an annular means having an outer annular spherically curved bearing surface to coact with the internal bearing surface of the socket member, said annular means comprising at least two ball members having adjacent faces disposed substantially parallel to the axis of the annular means, each ball member constituting a portion of the circumference of the outer annular bearing surface of the annular means, and a relatively thin layer of metal disposed between said adjacent faces of the ball members and having an integral-like bonding union therewith, said layer of metal having a relatively low melting temperature, to facilitate melting the same between said adjacent faces and to effect the bonding union therewith, after said ball members have been so positioned relative to each other and relative to the internal bearing surface of the socket member as to permit the outer bearing surface of each ball member to have bearing contact with the internal bearing surface of the socket member.

FRANK S. KEAHEY.